(12) United States Patent
Parekh et al.

(10) Patent No.: US 11,283,737 B2
(45) Date of Patent: *Mar. 22, 2022

(54) APPLICATION INITIATED CONVERSATIONS FOR CHATBOTS

(71) Applicant: Oracle International Corporation, Redwood Shores, CA (US)

(72) Inventors: Manish Parekh, San Jose, CA (US); King-Hwa Lee, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,620

(22) Filed: Apr. 19, 2021

(65) Prior Publication Data

US 2021/0243141 A1 Aug. 5, 2021

Related U.S. Application Data

(63) Continuation of application No. 16/857,766, filed on Apr. 24, 2020, now Pat. No. 11,012,384.

(60) Provisional application No. 62/839,582, filed on Apr. 26, 2019.

(51) Int. Cl.
| | |
|---|---|
| H04L 12/58 | (2006.01) |
| H04L 51/02 | (2022.01) |
| H04L 51/046 | (2022.01) |
| H04L 51/00 | (2022.01) |
| H04L 51/224 | (2022.01) |

(52) U.S. Cl.
CPC ............ *H04L 51/02* (2013.01); *H04L 51/046* (2013.01); *H04L 51/12* (2013.01); *H04L 51/16* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 10,594,635 | B2 * | 3/2020 | Kuncheria | G06Q 10/02 |
| 10,680,986 | B1 * | 6/2020 | Wu | H04L 51/16 |
| 11,012,384 | B2 * | 5/2021 | Parekh | H04L 51/16 |
| 11,121,987 | B1 * | 9/2021 | Schlicht | H04L 51/16 |

(Continued)

OTHER PUBLICATIONS

U.S. Appl. No. 16/857,766, "Notice of Allowance", dated Jan. 22, 2021, 10 pages.

*Primary Examiner* — Backhean Tiv
(74) *Attorney, Agent, or Firm* — Kilpatrick Townsend & Stockton LLP

(57) ABSTRACT

Techniques for described for invoking a chatbot in a chatbot system, in response to an event notification from a software application. The event notification can be sent to the chatbot system based on the software application determining that one or more conditions associated with an event are satisfied. In certain embodiments, the event notification contains information indicating a dialog flow state for starting a new conversation between a particular chatbot and a user. The event notification can also identify the user and/or the particular chatbot. In some instances, a prompt is output to the user requesting the user to confirm a start of the new conversation. Whether the prompt is output or not can depend on whether there is an existing conversation between the user and a chatbot in the chatbot system.

20 Claims, 8 Drawing Sheets

(56) References Cited

U.S. PATENT DOCUMENTS

| | | | |
|---|---|---|---|
| 2004/0078444 A1* | 4/2004 | Malik | H04M 3/53366 709/206 |
| 2005/0086309 A1* | 4/2005 | Galli | G06Q 10/107 709/206 |
| 2006/0129455 A1* | 6/2006 | Shah | G06Q 30/0267 705/14.54 |
| 2012/0041903 A1* | 2/2012 | Beilby | G06N 20/00 706/11 |
| 2012/0215871 A1* | 8/2012 | Zhang | G06F 16/258 709/206 |
| 2013/0262309 A1* | 10/2013 | Gadotti | G06Q 20/322 705/44 |
| 2014/0122619 A1* | 5/2014 | Duan | G06F 40/20 709/206 |
| 2014/0207882 A1* | 7/2014 | Joo | H04L 51/04 709/206 |
| 2017/0048170 A1* | 2/2017 | Smullen | H04L 67/306 |
| 2017/0132019 A1* | 5/2017 | Karashchuk | H04W 4/12 |
| 2017/0180284 A1* | 6/2017 | Smullen | H04L 67/306 |
| 2018/0096686 A1* | 4/2018 | Borsutsky | H04L 51/02 |
| 2018/0196796 A1* | 7/2018 | Wu | G06F 40/289 |
| 2018/0199156 A1* | 7/2018 | Gandhi | H04W 4/023 |
| 2018/0219921 A1* | 8/2018 | Baer | H04L 51/16 |
| 2018/0293983 A1* | 10/2018 | Choi | G06F 3/0484 |
| 2018/0322380 A1* | 11/2018 | Aggarwal | G06N 3/006 |
| 2018/0324116 A1* | 11/2018 | Vaduva | G06F 3/04842 |
| 2018/0331980 A1* | 11/2018 | Jernstrom | H04L 12/1818 |
| 2019/0034409 A1* | 1/2019 | Curtis | G06F 40/123 |
| 2019/0068527 A1* | 2/2019 | Chen | G06Q 10/00 |
| 2019/0095171 A1* | 3/2019 | Carson | G06F 3/167 |
| 2019/0124020 A1* | 4/2019 | Bobbarjung | G06Q 20/123 |
| 2019/0158433 A1* | 5/2019 | Yun | G06F 3/167 |
| 2019/0182184 A1* | 6/2019 | Myung | H04L 51/02 |
| 2019/0213466 A1* | 7/2019 | Jeswani | G06F 16/24522 |
| 2019/0325868 A1* | 10/2019 | Lecue | G10L 15/22 |
| 2020/0097221 A1* | 3/2020 | Matsumoto | H04L 51/32 |
| 2020/0143797 A1* | 5/2020 | Manoharan | G10L 15/16 |
| 2020/0320116 A1* | 10/2020 | Wu | G06F 16/93 |
| 2020/0342873 A1* | 10/2020 | Teserra | G06F 40/30 |
| 2020/0342874 A1* | 10/2020 | Teserra | G06F 40/263 |
| 2020/0344186 A1* | 10/2020 | Parekh | H04L 51/02 |
| 2021/0150150 A1* | 5/2021 | Wu | G06N 3/088 |
| 2021/0243141 A1* | 8/2021 | Parekh | H04L 51/12 |

* cited by examiner

EVENT NOTIFICATION 402

```
{
  "userId": "16035550100",
  "messagePayload": {
    "type": "application",
    "payloadType": "msgReminder",
    "channelName": "AppointmentUserChannel",
    "variables": {
      "patientName": "Joe Doe",
      "appointmentTime": "5:00 pm"
    }
  }
}
```

FIG. 4A

DIALOG FLOW STATE 410

```
remindermessage:
  component: "System.Output"
  properties:
    text: "Hi ${patientName.value}, your next appointment is scheduled for ${appointmentTime.value}. Please reply to this message to confirm, cancel, or postpone your appointment."
  transitions:
    return: "done"
```

FIG. 4B

APPLICATION INITIATED CONVERSATIONS FOR CHATBOTS

CROSS-REFERENCES TO RELATED APPLICATIONS

The present application is a continuation of and claims priority to U.S. application Ser. No. 16/857,766, filed Apr. 24, 2020, entitled "APPLICATION INITIATED CONVERSATIONS FOR CHATBOTS," which claims the benefit of and priority under 35 U.S.C. 119(e) to U.S. Provisional Application No. 62/839,582, filed Apr. 26, 2019, entitled "APPLICATION INITIATED CONVERSATIONS FOR CHATBOTS." The contents of both applications are incorporated herein by reference in their entirety for all purposes.

BACKGROUND

Chatbots provide an interface for conversations with human users. Chatbots can be configured to perform various tasks in response to user input provided during a conversation. The user input can be supplied in various forms including, for example, audio input and text input. Thus, natural language understanding (NLU), speech-to-text, and other linguistic processing techniques may be employed as part of the processing performed by a chatbot. In some computing environments, multiple chatbots are available for conversing with a user, with each chatbot handling a different set of tasks.

A conversation between a user and a chatbot is typically initiated in response to input from the user, for example, a text message sent from the user to the chatbot. The conversation is usually initiated when the user decides that they need the chatbot's assistance in performing some task. Thus, the user decides when to begin interacting with the chatbot.

SUMMARY

The present disclosure relates generally to initiating conversations with chatbots. More particularly, techniques are described for invoking chatbots based on events generated by software applications. In certain embodiments, chatbot conversations can be initiated in different ways, including through direct user interaction with a chatbot system. In addition to user-initiated conversations, certain embodiments described herein provide for automated initiation of a conversation based on an event generated by a software application in response to the software application determining that one or more conditions associated with the event are satisfied. A chatbot system can be informed about the event through an electronic notification (e.g., a digital message) sent from the software application. In certain embodiments, the notification includes information identifying a particular user, information identifying a particular chatbot, information indicating a starting state for a conversation, or a combination thereof.

In certain embodiments, a method performed by a computer-implemented chatbot system involves receiving, by the chatbot system, an event notification from a software application, where the event notification is generated based on the software application determining that one or more conditions associated with an event are satisfied. The method further involves determining, by the chatbot system and based on information contained in the event notification, a dialog flow state for starting a new conversation between a first chatbot in the chatbot system and a user. The method further involves determining, by the chatbot system, whether to output to the user a prompt requesting the user to confirm a start of the new conversation. Determining whether to output the prompt can include determining whether there is an existing conversation between the user and a chatbot in the chatbot system. The method further involves starting, by the chatbot system, the new conversation in the determined dialog flow state.

BRIEF DESCRIPTION OF THE DRAWINGS

FIG. 4A illustrates an example event notification according to certain embodiments.

FIG. 4B illustrates an example of a dialog flow state that can be configured for an event according to certain embodiments.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to initiating conversations with chatbots. More particularly, techniques are described for invoking chatbots based on events generated by software applications. In certain embodiments, chatbot conversations can be initiated in different ways, including through direct user interaction with a chatbot system. In addition to user-initiated conversations, certain embodiments described herein provide for automated initiation of a conversation based on an event generated by a software application in response to the software application determining that one or more conditions associated with the event are satisfied. A chatbot system can be informed about the event through an electronic notification (e.g., a digital message) sent from the software application. In certain embodiments, the notification includes information identifying a particular user, information identifying a particular chatbot, information indicating a starting state for a conversation, or a combination thereof.

Chatbot System Overview (Example)

Figure 1:
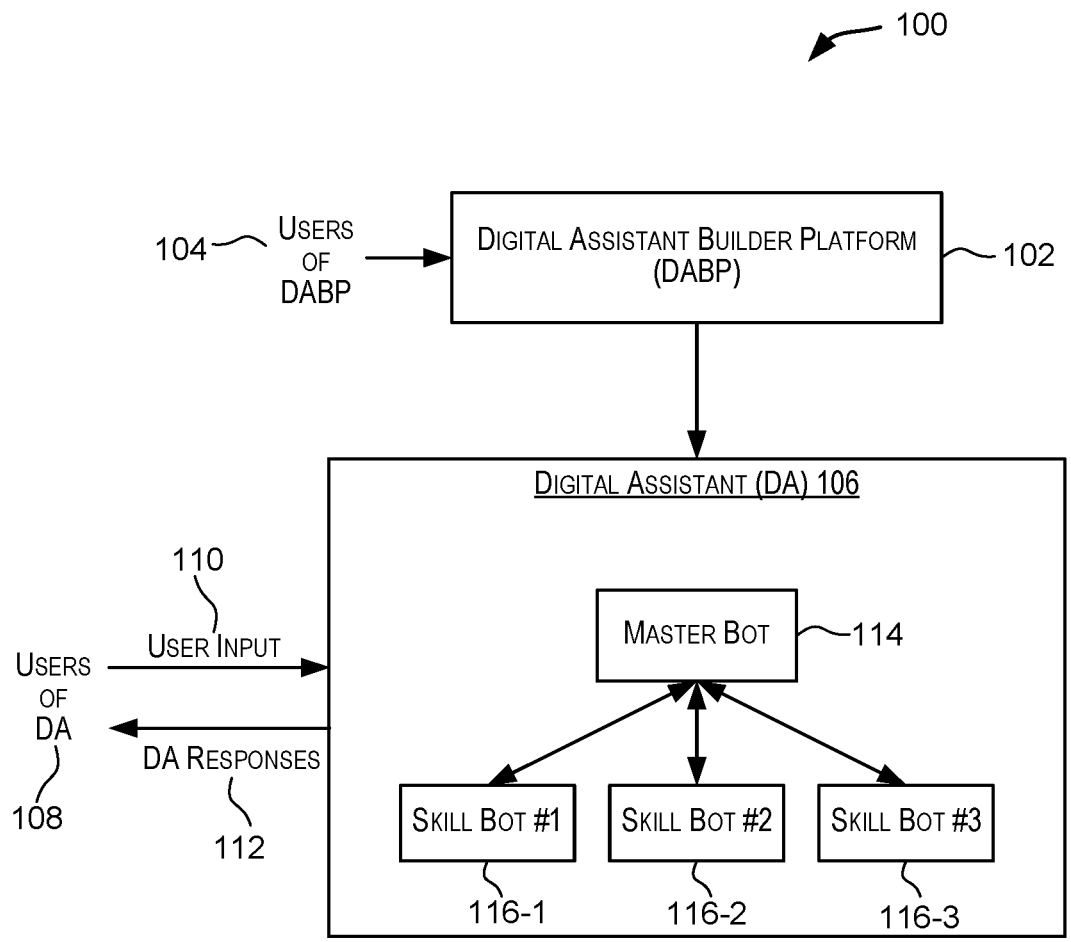
FIG. 1 is a simplified block diagram of an environment incorporating a chatbot system according to certain embodiments.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs (Uniform Resource Locators), and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the Exit and Help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as an explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Application-Initiated Conversation Environment

Figure 2:
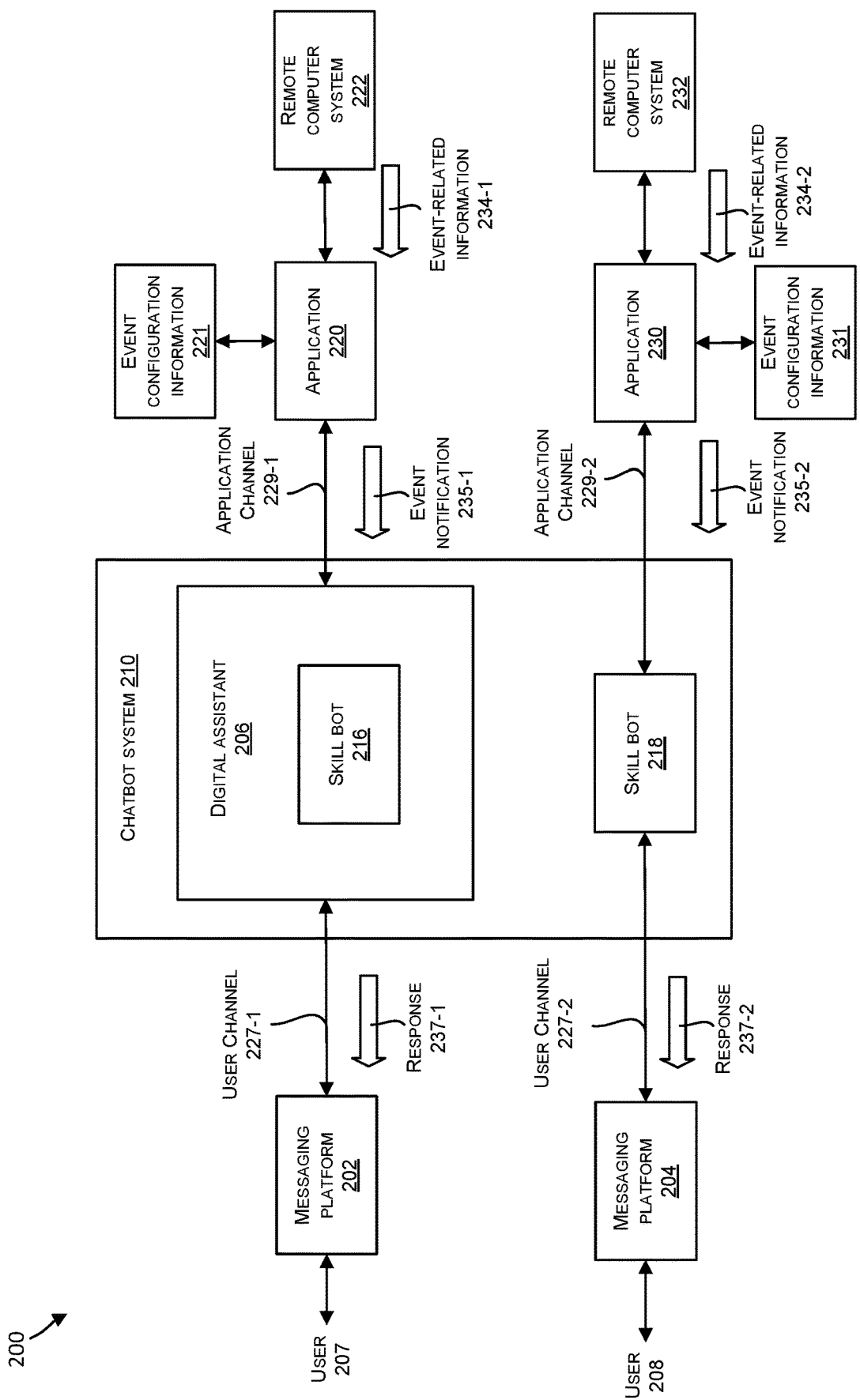
FIG. 2 is a simplified block diagram of an environment incorporating a chatbot system configured to handle application-initiated conversations according to certain embodiments.

FIG. 2 is a simplified block diagram of an environment 200 incorporating a chatbot system 210 configured to handle application-initiated conversations (AICs) according to certain embodiments. The chatbot system 210 can include a digital assistant 206 created in a similar manner to the digital assistant 106 in the embodiment of FIG. 1, using the DABP 102. As depicted in FIG. 2, the environment 200 includes messaging platforms 202 and 204 and applications 220 and 230. FIG. 2 is merely an example. In other embodiments, the number of messaging platforms and applications may be different. For instance, the environment 200 can be implemented using one messaging platform and one application.

Digital assistant 206 is analogous to the digital assistant 106 in FIG. 1. As described above, a digital assistant can include a master bot and one or more skill bots. However, for simplicity, the digital assistant 206 is depicted in FIG. 2 as having only one chatbot, in particular, a skill bot 216. In addition to the digital assistant 206, the chatbot system 210 can include one or more stand-alone bots that are configured to engage in conversation with a user of the chatbot system without a digital assistant serving as an interface between the stand-alone bot and the user. For example, as depicted in FIG. 2, the chatbot system 210 can include a skill bot 218 that is separate from the digital assistant 206.

Skill bots 216 and 218 can be implemented in the same manner as described above with respect to the skill bots 116 in FIG. 1. Each of the skill bots 216, 218 can be configured to perform one or more types of tasks on behalf of a user of the chatbot system 210. The skill bot 216 is added to the digital assistant 206, whereas the skill bot 218 is standalone. Although part of the same chatbot system 210, the skill bot 216 is not necessarily executed on the same computing device(s) as the skill bot 218. For instance, the skill bots 216 and 218 could be executed on different computers.

Messaging platforms 202 and 204 operate as intermediaries between the chatbot system 210 and users of the chatbot system 210. For example, messaging platform 202 may be convey messages between a user 207 and the chatbot system 210. Similarly, messaging platform 204 may convey messages between a user 208 and the chatbot system 210. Each messaging platform 202, 204 is generally configured to communicate with numerous different users through the respective computing devices of such users (e.g., mobile devices or desktop computers). The messaging platforms 202, 204 can be implemented using any communication infrastructure suitable for conducting a conversation. For instance, a messaging platform could be a short messaging service (SMS) based platform configured to send and receive text messages from mobile phones, where the users of the mobile phones are identified based on telephone number. As another example, a messaging platform could be configured to provide an instant messenger service accessed through an application executed on a user's computing device.

As indicated above, the messaging platforms 202, 204 can convey messages between users and the chatbot system 210. Thus, a conversation between a user and a chatbot within the chatbot system 210 can be conducted through a messaging platform. Additionally, in some embodiments, the messaging platforms 202, 204 may permit users of the chatbot system 210 to communicate with each other. For instance, users with access to the same messaging platform could send messages to each other via the messaging platform.

Access to a messaging platform by a chatbot system user (e.g., users 207, 208) typically requires creation of a user identifier (ID) and possibly one or more security credentials (e.g., a password). For instance, an SMS based messaging platform may be configured to recognize a user's telephone number as their user ID. As another example, the user ID could be an alphanumeric username selected by the user or generated by the messaging platform for the user.

For each user that the chatbot system 210 communicates with, the chatbot system 210 can create a user-specific communications channel for transmitting messages between the user and the chatbot system 210. For instance, as shown in FIG. 2, the messaging platform 202 is coupled to the chatbot system 210 via a user channel 227-1. Similarly, the messaging platform 204 is coupled to the chatbot system 210 via a user channel 227-2. The chatbot system 210 can recognize a user by the same user ID that the user uses to access a messaging platform. Therefore, each user channel 227 may be associated with a particular user ID that is used to access a particular messaging platform.

In some embodiments, a user may need to be authenticated before being able to access the chatbot system 210. For instance, the environment 200 could include a security service provider (e.g., a single sign-on (SSO) authentication service) configured to, after validating a user supplied credential, generate an access token that permits the user's computing device to communicate with the chatbot system 210. The security mechanism used by the chatbot system 210 can be separate from that used by a messaging platform (e.g., a user may log into a messaging platform and the chatbot system 210 using different credentials). Alternatively, a shared security mechanism can be used. For instance, the messaging platforms 202, 204 and the chatbot system 210 could all be participants in the same SSO authentication infrastructure.

Applications 220 and 230 are software applications that provide functionality independent of the conversation-related functionality provided by the chatbot system 210. For example, the applications 220, 230 could be applications that provide enterprise functionality (e.g., human resources, accounting, custom relationship management, etc.). The applications 220, 230 are executed on one or more computer systems. In certain embodiments, the computer systems on which applications 220, 230 are executed are remotely located from the chatbot system 210. For instance, each of the applications 220, 230 could be executed on a separate server or on a computing device used by a user 206, 207 for communicating with the chatbot system 210. Thus, the applications 220, 230 can be executed from any number of different locations. Further, in some embodiments, one or more of the applications 220, 230 may be provided through a web-based or cloud service.

The application 220 is configured to initiate conversations between the user 207 and the digital assistant 206 (more specifically, the skill bot 216). Similarly, the application 230 is configured to initiate conversations between the user 208 and the skill bot 218. To initiate a conversation, an application can generate an event and send the event to the chatbot system 210 in the form of a notification 235 (e.g., a digital message). The notification can be sent through an application-specific communication channel. For instance, as depicted in FIG. 2, the application 220 is coupled to the digital assistant 206 through an application channel 229-1, and the application 230 is coupled to the skill bot 218 through an application channel 229-2. The application channels can be created by the chatbot system 210 specifically for communications between a skill bot and an application. In some embodiments, an application channel is configured to receive notifications 235 in the form of a Hypertext Transfer Protocol (HTTP) based POST request, where the POST request is sent through an application program interface (API), e.g., a Representational State Transfer (REST) based API.

In certain embodiments, one or more of the application channels 229 may be secured communication channels. For instance, each application 220, 230 may be required to authenticate itself with the chatbot system 210 before the chatbot system 210 will accept any notifications 235 from the application. Further, in some embodiments, each application channel 229 is assigned an inbound URL for receiving messages from an application and, optionally, an outbound URL for sending messages to the application. For instance, a notification 235 could be sent through an inbound URL together with a security artifact (e.g., a secret key generated by the chatbot system 210 for signing messages from a particular application with a cryptographic hash function such as SHA-256).

A notification 235 can include information indicating which chatbot is to engage a user in conversation. For instance, a notification may include a payload section containing an identifier of a particular chatbot (e.g., the invocation name of a skill bot). Alternatively, the chatbot that is to engage the user in conversation can be identified based on the application channel 229 that the notification 235 is sent through. As indicated above, the application channels 229 can be application-specific. Further, in some embodiments, a dedicated application channel is provided for communications between an application and a particular chatbot. Thus, the chatbot system 210 could determine which chatbot to use for a conversation based on the application channel over which the notification 235 is sent.

In certain embodiments, applications are configured to generate events based on evaluating conditions associated with the events. The conditions for events generated by the applications 220 and 230 can be stored as event configuration information 221 and 231, respectively. An application can be configured to generate one or more types of events. For each type of event, a rule including a set of one or more conditions can be defined such that when the set of one or more conditions is satisfied, the application evaluating the conditions will send a corresponding notification 235 to the chatbot system 210. In certain embodiments, an end-user (e.g., one of the users 207, 208) can configure the rules for an application in order to specify what conditions will trigger an application-initiated conversation and/or specify what chatbots (or dialog flow states associated with those chatbots) to invoke upon the application determining that a set of one or more conditions is satisfied. In some embodiments, a bot developer or other administrative user (e.g., a user 104 of the DABP in FIG. 1 or an enterprise user who controls one of the applications 220, 230) can configure the conditions evaluated by an application.

A condition can be satisfied based upon the occurrence or non-occurrence of the condition, as detected through monitoring performed by an application. The monitoring can be performed with respect to data maintained locally within a computer system executing the application. For instance, a condition may correspond to the status of a variable stored in database of a computer system that executes the application 220. An application can detect the occurrence of a condition through polling, receiving push notifications, continuous monitoring (e.g., of a database configured to store event-related information), or other detection mechanisms. In some instances, an application may, as part of determining whether a condition is satisfied, communicate with one or more computing devices or systems external to the computer system on which the application is executed. For example, as depicted in FIG. 2, remote computer systems 222 and 232 may be coupled to the applications 220 and 230, respectively. Thus, the application 220 could monitor conditions within the remote computer system 222 and, similarly, the application 230 could monitor conditions within the remote computer system 232. The statuses of the conditions within the remote computer systems 222 and 232 can be communicated to the applications as event-related information 234-1 and 234-2, respectively.

As an example of a scenario in which a user of a chatbot system may find it helpful to have a conversation initiated by an application, consider the following use case. Suppose that the application 220 is an expense reporting application through which the user 207 and other users associated with an enterprise (e.g., employees of the same company) can submit expense reports for reimbursement. Further, suppose that the skill bot 216 is a finance bot configured to assist users with managing their expense reports. For instance, the skill bot 216 could be configured with dialog flows designed to permit the user 207 to review, edit, and resubmit expense reports for approval by the accounting department of the enterprise.

Depending on whether certain conditions occur with respect to an expense report, a conversation between the skill bot 216 and the user 207 could begin in various states. For instance, the application 220 could generate a first event when an expense report has been approved, a second event when an expense report has been rejected, and a third event when additional information is required for processing an expense report. If the first event is generated, the skill bot 216 could be invoked in a dialog state associated with output of a prompt requesting user acknowledgment of the approval. If the second event is generated, the skill bot 216 could be invoked in a dialog state associated with output of user selectable options for editing and resubmitting the expense report. If the third event is generated, the skill bot 216 could be invoked in a dialog state associated with output of a prompt for the user to complete the expense report by providing missing information. Thus, an application can be configured to generate different types of events depending on what conditions are satisfied, with each type of event being associated with a corresponding dialog state for starting a conversation relating to the event.

The chatbot system 210 can be configured to, upon receiving a notification 235, generate a response 237 for output to a particular user. As indicated above, the chatbot to use for engaging a user in an AIC can be identified based on information contained in the notification 235 or based on the application channel 229 through which the notification 235 is received by the chatbot system 210. Additionally, the notification 235 can indicate which user the response 237 should be sent to, i.e., the user who is to participate in the AIC. For instance, the notification 235-1 could include a user ID that uniquely identifies the user 207 to the chatbot system 210. As indicated above, this user ID can be the same user identifier by which the user accesses the messaging platform 202. Alternatively, the chatbot system 210 may associate a user ID with the user 207 that is different from the user identifier that the messaging platform 202 associates with the user 207. For instance, in some embodiments, the chatbot system 210 may associate an authenticated user ID with a user, where the authenticated user ID is assigned to the user by a security and/or identity service provider. The chatbot system 210 may link the authenticated user ID with the user identifier used for accessing the messaging platform so that when a notification 235 containing an authenticated user ID is received, a response 237 can be sent through the appropriate user channel 227. The application sending the notification 235 may be aware of the user ID as a result of an earlier communication between the application and the entity that assigned the user ID (e.g., the chatbot system 210 or a security/identity service provider). In some embodiments, the application or the computer system on which the application executes is the entity that assigns the user ID included in the notification 235.

Having identified all the participants to a conversation (e.g., a particular user and a particular chatbot) based on receipt of a notification 235, the chatbot system 210 can generate a response 237 for transmission through the user channel 227 associated with the identified user. The response 237 may depend on whether or not the identified user is currently engaged in a conversation with a chatbot in the chatbot system 210 (e.g., the skill bot 216 or the skill bot 218). For example, if the user is currently engaged in a conversation with a chatbot, the chatbot system 210 may generate a response 237 requesting the user to confirm that he or she wishes to start to the new conversation. Such a response can be generated even if the chatbot for the new conversation is the same chatbot that the user is currently having a conversation with. That is because the new conversation may require switching to a dialog flow associated with a different intent than the intent that is associated with the current dialog flow. As an example, the user could be asking a finance bot about the balance in the user's bank account, and the new conversation could relate to another task that the finance bot is configured to help the user with, such as verifying a credit card charge. If the identified user is not currently engaged in a conversation with a chatbot in the chatbot system 210, then the chatbot system 210 may simply switch to the new conversation by invoking the identified chatbot, in which case the response 237 could be a response generated by the identified chatbot according to a dialog flow definition that has been configured for the identified chatbot. The instance, the notification 235-1 or information derived from the notification 235-1 could be forwarded from the digital assistant 206 to the skill bot 216 for use in determining the response 237-1.

If the user is currently engaged in a conversation and indicates that he or she does not wish to start the new conversation, the chatbot system 210 may permit the user to finish the existing conversation. Upon reaching the end of the existing conversation (e.g., based on user input of an utterance containing the word "exit" or after the user has provided all the information needed for the chatbot to complete a certain task), the chatbot system 210 can once again prompt the user for confirmation that the user wants to start the new conversation. Thus, the chatbot system 210 can provide the user with the opportunity to begin the new conversation even after the user has indicated that the existing conversation should not be interrupted.

If the user is currently engaged in a conversation and indicates that he or she wants to start the new conversation, the chatbot system 210 may suspend the existing conversation and subsequently provide the user with an opportunity to resume the suspended conversation. For instance, when the new conversation ends, the chatbot system 210 can output a prompt requesting the user to confirm that the suspended conversation should be resumed. The suspended conversation can be resumed based on saving the dialog flow state that existed at the time the switch to the new conversation was performed. For instance, the chatbot system 210 could maintain a context stack for all conversations involving the user that have yet to be terminated, where each entry in the context stack points to a dialog flow state associated with a particular chatbot.

The dialog flow state in which to begin the new conversation can be expressly indicated in a notification 235. Alternatively, in some embodiments, the chatbot system 210 can determine which dialog flow state to start in based on the type of event that is generated. For instance, each type of event that an application is capable of generating can be assigned an event identifier, the notification 235 can include such an event identifier, and the chatbot system 210 can maintain a mapping between the event identifier and a particular dialog flow state. The event identifiers can be unique across all the chatbots in the chatbot system 210 so that no event identifier is assigned to more than one type of event. Alternatively, event identifiers could be unique within a chatbot, but not across chatbots. Associating event identifiers with dialog flow states would permit the dialog flow definition of a chatbot to be updated (e.g., by adding new states or changing the name of an existing state) without also having to reconfigure an application in accordance with the updated dialog flow definition. Instead, the application need not be aware of which dialog flow state to use, and may simply refer to an event by its event identifier, with the mapping between the event identifier and its corresponding dialog flow state being updated as needed via the chatbot system 210 (e.g., whenever the name of a dialog flow state that has previously been mapped is changed).

In addition to indicating (at least indirectly) a starting state for a new conversation, a notification 235 can, in some instances, include information to be processed by the chatbot participating in the new conversation. For instance, the payload of a notification 235 could include an event identifier plus values for one or more variables (e.g., named entities) recognized by the chatbot system 210. The values contained in a notification 235 could be values that are processed by the chatbot to determine, in connection with the starting state, an action to take or a message to present to the user. For example, a notification 235 could pass the value of "checking" for the AccountType entity to enable a chatbot to begin a conversation with a welcome message related to checking accounts.

Figure 3:
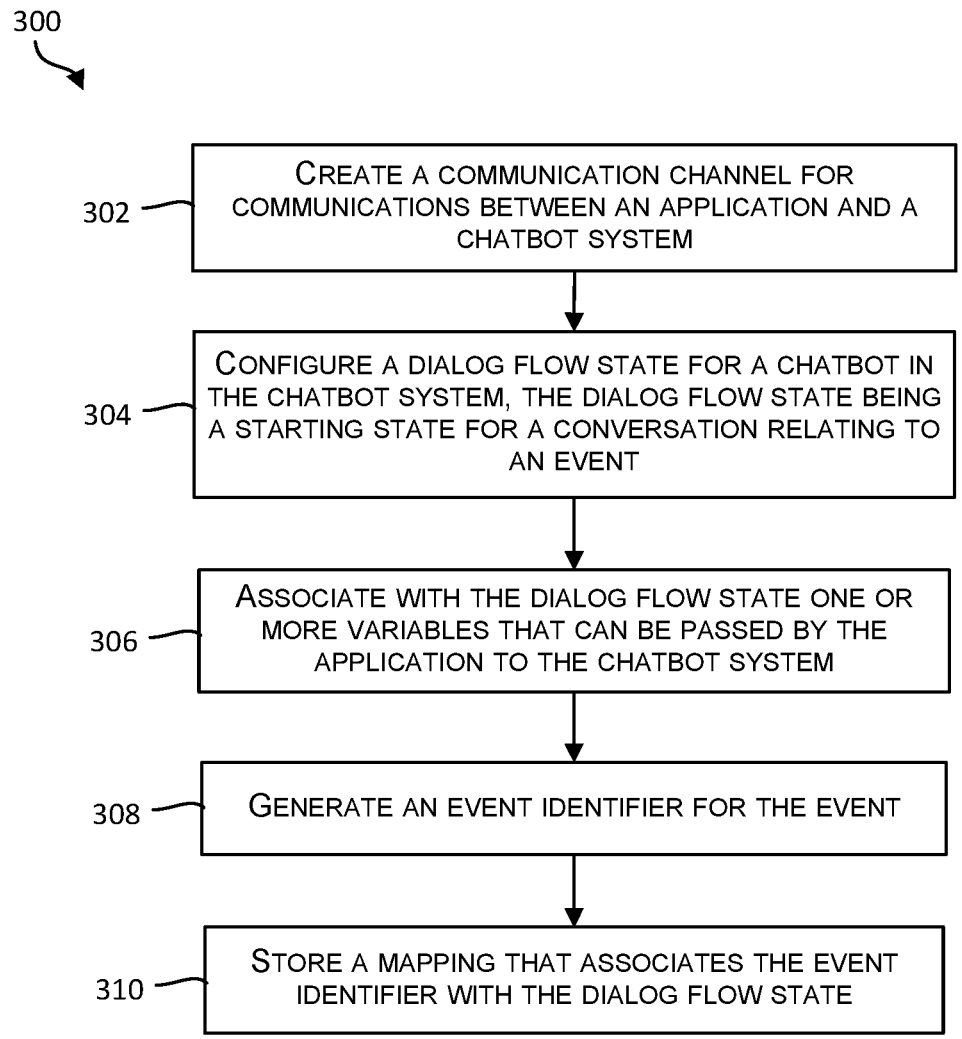
FIG. 3 is simplified flowchart depicting a process for configuring a chatbot system to handle application-initiated conversations according to certain embodiments.

FIG. 3 is simplified flowchart depicting a process 300 for configuring a chatbot system to handle application-initiated conversations according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed using a digital assistant builder platform, e.g., the DABP 102.

At 302, a communication channel is created for communications between a chatbot system and a software application. For example, the communication channel may correspond to one of the application channels 229 in FIG. 2. In some embodiments, the communication channel is specified as part of configuring a skill bot. For example, prior to adding a skill bot to a digital assistant or as a stand-alone bot, the skill bot can be configured to define a separate application channel for each application that the skill bot is to communicate with. Upon adding the skill bot, the application channels configured for the skill bot can be instantiated by the chatbot system, e.g., through allocating computing resources for each configured application channel.

At 304, a dialog flow state is configured for a chatbot in the chatbot system. In particular, the dialog flow state is a starting state for a conversation relating to an event that can be generated by an application. As indicated above, a dialog flow definition can include a states section with different states that the dialog flow can transition to. The dialog flow state configured in 304 can be one of the states in the states section and can be defined together with other states in the states section or added after the chatbot has been deployed in the chatbot system. For example, the dialog flow state in 304 could be a custom state created by a skill bot developer before or after adding the skill bot to a digital assistant.

At 306, one or more variables are associated with the dialog flow state configured in 304. These are variables whose values can be passed to the chatbot system by an application (e.g., a value contained in the payload of a notification 235). The one or more variables could include, for example, system level entities that are recognized by all chatbots in the chatbot system and/or bot level entities that are configured specifically for use by a particular chatbot. In certain embodiments, the associating of the variables in 306 is performed by declaring at least some of these variables within the context section of the dialog flow definition for the chatbot whose dialog flow state is configured in 304.

At 308, an event identifier is generated for the event mentioned above in connection with block 304. The event identifier serves to distinguish the event from other types of events that the chatbot system can be notified about. As mentioned above, event identifiers can be unique within a chatbot or across chatbots.

At 310, a mapping that associates the event identifier generated in 308 with the dialog flow state configured in 304 is stored. For example, the mapping can be stored as a lookup table in a memory accessible to the chatbot system. In certain embodiments, the chatbot system is configured to maintain a separate mapping for each chatbot in the chatbot system. Additionally, multiple event identifiers can be mapped to the same dialog flow state, e.g., a starting state that is common to two different types of events.

FIG. 4A illustrates contents of an example event notification 402 according to certain embodiments. The notification 402 may correspond to one of the notifications 235 in FIG. 2. As depicted in FIG. 4A, the notification 402 can include a user ID (e.g., "16035550100") and a payload section. The payload section can indicate that the notification 402 is being sent from an application (type: "application") and can include an event identifier (e.g., "msgReminder"). The payload section can also include the name of a user channel (e.g., "AppointmentUserChannel") that can be used to send, via a messaging platform, communications between the chatbot system and the user associated with the user ID. For instance, AppointmentUserChannel may correspond to one of the user channels 227 in FIG. 2. Additionally, the payload section can include values for one or more variables recognized by the chatbot system. In FIG. 4A, these values include the value "Joe Doe" for the variable "patientName" and the value "5:00 pm" for the variable "appointmentTime." In the example of FIG. 4A, the notification 402 does not expressly indicate which chatbot to use for a conversation relating to the event associated with the identifier "msgReminder." However, as indicated above, the chatbot can be identified based on a mapping between the event identifier (msgReminder) and a dialog flow state configured for the chatbot (e.g., the "remindermessage" state in FIG. 4B) or based on the application channel that the notification 402 is sent through. Further, in another embodiment, the notification 402 may expressly indicate which chatbot to use, e.g., by including in the payload an invocation name or other identifier of the chatbot (e.g., "skillName": "FinancialBot").

FIG. 4B illustrates an example of a dialog flow state 410 (named "remindermessage") that can be configured for the event that is the subject of the notification 402 in FIG. 4A. As shown in FIG. 4B, the dialog flow state 410 is configured to generate a reminder message for a user based on the variables whose values are included in the notification 402. Substituting the values from the notification 402 into the body of the reminder message would produce the following: "Hi Joe Doe, your next appointment is scheduled for 5:00 pm. Please reply to this message to confirm, cancel, or postpone your appointment." This reminder message would be sent to the user associated with user ID 16035550100, via the AppointmentUserChannel indicated in the notification 402.

Figure 5:
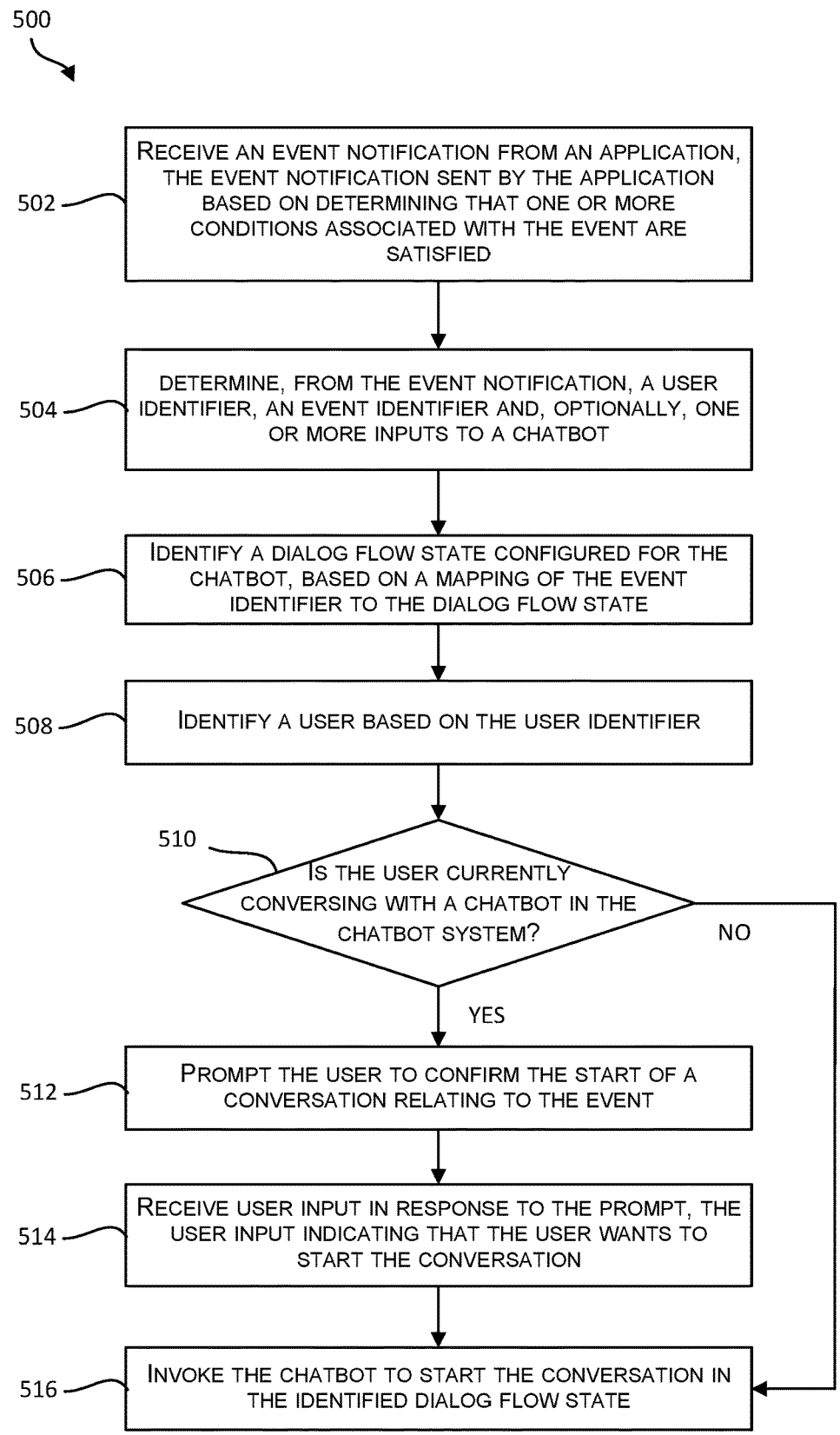
FIG. 5 is simplified flowchart depicting a process for initiating a conversation based on an event notification according to certain embodiments.

FIG. 5 is simplified flowchart depicting a process 500 for initiating a conversation based on an event notification, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 5 may be performed using a chatbot system, e.g., the chatbot system 210.

At 502, an event notification is received from a software application. The event notification can be an electronic message (e.g., a message that is digitally encoded into one or more packets) that is sent based on the software application determining that one or more conditions associated with the event are satisfied.

At 504, a user identifier, an event identifier and, optionally, one or more inputs to a chatbot are identified. As indicated above, this information can be included in a payload of the notification. Accordingly, the notification can be parsed to extract these items of information.

At 506, a dialog flow state is identified. The identified dialog flow state is a state which has been configured for the chatbot that will be used for a conversation relating to the event. For instance, the dialog flow state may be a state associated with a particular intent representing a task that the chatbot is capable of performing. The dialog flow state can be identified based on a stored mapping, e.g., by using the event identifier as an index to a lookup table that stores an identifier of the dialog flow state (e.g., the name of the dialog flow state) in association with the event identifier. In some embodiments, identifying the dialog flow state involves first identifying the chatbot (e.g., based on an application channel through which the notification was received in 502 or based on a chatbot identifier included in the notification) and then performing a lookup or search using information stored for the identified chatbot (e.g., a lookup table created specifically for the identified chatbot).

At 508, the user who is to participate in the conversation is identified based on the user identifier. As discussed earlier, a user identifier can be an identifier that is associated with a particular user. Thus, the user identifier can be used to direct responses from the chatbot system to the particular user (e.g., through a user channel associated with the user identifier).

At 510, a determination is made whether the identified user is currently conversing with a chatbot in the chatbot system (e.g., a stand-alone skill bot or a skill bot in a digital assistant). This determination can be made by checking for the existence of any dialog flows that have not yet reached a terminal or end state. In some instances, one or more dialog flows may be queued (e.g., in a context stack) for the user and only one of the dialog flows is currently active. If the user is currently conversing with a chatbot in the chatbot system, processing proceeds to 512. Otherwise, processing proceeds to 516.

At 512, the user is prompted to confirm the start of the conversation relating to the event. The prompt can be sent to the user's computing device through a messaging platform and may be output at the user's computer device as an audio and/or visual message requesting a response from the user (e.g., user input indicating yes or no).

At 514, user input is received in response to the prompt in 512. The user input can be received through the same messaging platform used for sending the prompt and indicates that the user wants to start the new conversation. As indicated above, such input can be received at various times relative to an existing conversation. For instance, an indication to start a new conversation can be received before interrupting the existing conversation or after the existing conversation has reached an end.

At 516, the chatbot for which the dialog flow state identified in 506 is configured is invoked in the identified dialog flow state. Depending on how this dialog flow state has been configured, the chatbot may perform one or more actions and/or generate one or more messages for the user. Further, as indicated above, these actions or messages can be determined based on input data (e.g., values for one or more variables) included in the notification.

Example Application-Initiated Conversations

The following are examples of dialog that can be generated in connection with an application-initiated conversation. In these examples, the responses to the user are generated by a digital assistant (DA) that includes a finance bot and a pizza ordering bot. However, the responses could equally be generated by a chatbot system with stand-alone skill bots.

Example 1: No Existing Conversation (Event Notification Received)
DA: For which account do you want your balance? (1) checking, (2) savings, (3) credit card
User: savings
DA: The balance in your savings account (258923-832) is $2,610.56

In example 1, the user is not currently engaged in conversation with any chatbot in the chatbot system at the time that the event notification is received. Accordingly, the chatbot system (e.g., the digital assistant) can invoke the chatbot for the new conversation without prompting or notifying the user. In this example, the chatbot for the new conversation is a finance bot configured to provide the user with the balance in the user's financial account. The finance bot is invoked in a dialog flow state associated with output of a request for user input identifying the specific account that the user is interested in knowing the balance of. As discussed above, this starting state can be mapped to an event identifier contained in the event notification.

Example 2: Existing Conversation Interrupted to Start New Conversation

User: order pizza
DA: How old are you?
(Event notification received)
DA: Do you want to switch to Notification in FinancialBot now?
User: Yes
DA: For which account do you want your balance? (1) checking, (2) savings, (3) credit card
User: savings
DA: The balance in your savings account (258923-832) is $2,610.56
DA: Do you want to resume OrderPizza in PizzaBot now?
User: Yes
DA: How old are you?
User: 20
DA: What crust do you want for your pizza? (1) Thick, (2) Thin, (3) Stuffed, (4) Pan
User: Thick
. . .

In example 2, the user is conversing with a pizza ordering bot when the event notification is received. Accordingly, the chatbot system or digital assistant generates a prompt requesting the user to confirm whether the user wants to switch to the new conversation (e.g., a conversation with the finance bot). As shown in the example dialog above, if the user responds by indicating that the new conversation should begin, the existing conversation is interrupted (e.g., temporarily suspended). Once the new conversation has ended (e.g., after the finance bot has provided the balance in the user's account), the chatbot system asks the user whether to resume the interrupted conversation with the pizza ordering bot. When the user indicates that they want to resume the interrupted conversation, the interrupted conversation is resumed in the same dialog flow state where the conversation left off.

Example 3: New Conversation Postponed Until End of Existing Conversation

User: order pizza
DA: How old are you?
(Event notification received)
DA: Do you want to switch to Notification in FinancialBot now?
User: No
DA: How old are you?
User: 20
DA: What crust do you want for your pizza? (1) Thick, (2) Thin, (3) Stuffed, (4) Pan
User: Thick
. . .
(End of order pizza flow)
DA: Do you want to start with Notification in FinancialBot now?
User: Yes
DA: For which account do you want your balance? (1) checking, (2) savings, (3) credit card
User: savings
DA: The balance in your savings account (258923-832) is $2,610.56

Example 3 illustrates what might happen if the user responds to the prompt in example 2 by indicating that they do not wish to start the new conversation. In that case, the user is permitted to continue conversing with the pizza ordering bot. After the end of the conversation (e.g., once the user has finished placing an order for pizza), the digital assistant once again asks the user if they want to start the new conversation.

Example Computing Environments for Implementing a Chatbot System

Figure 6:
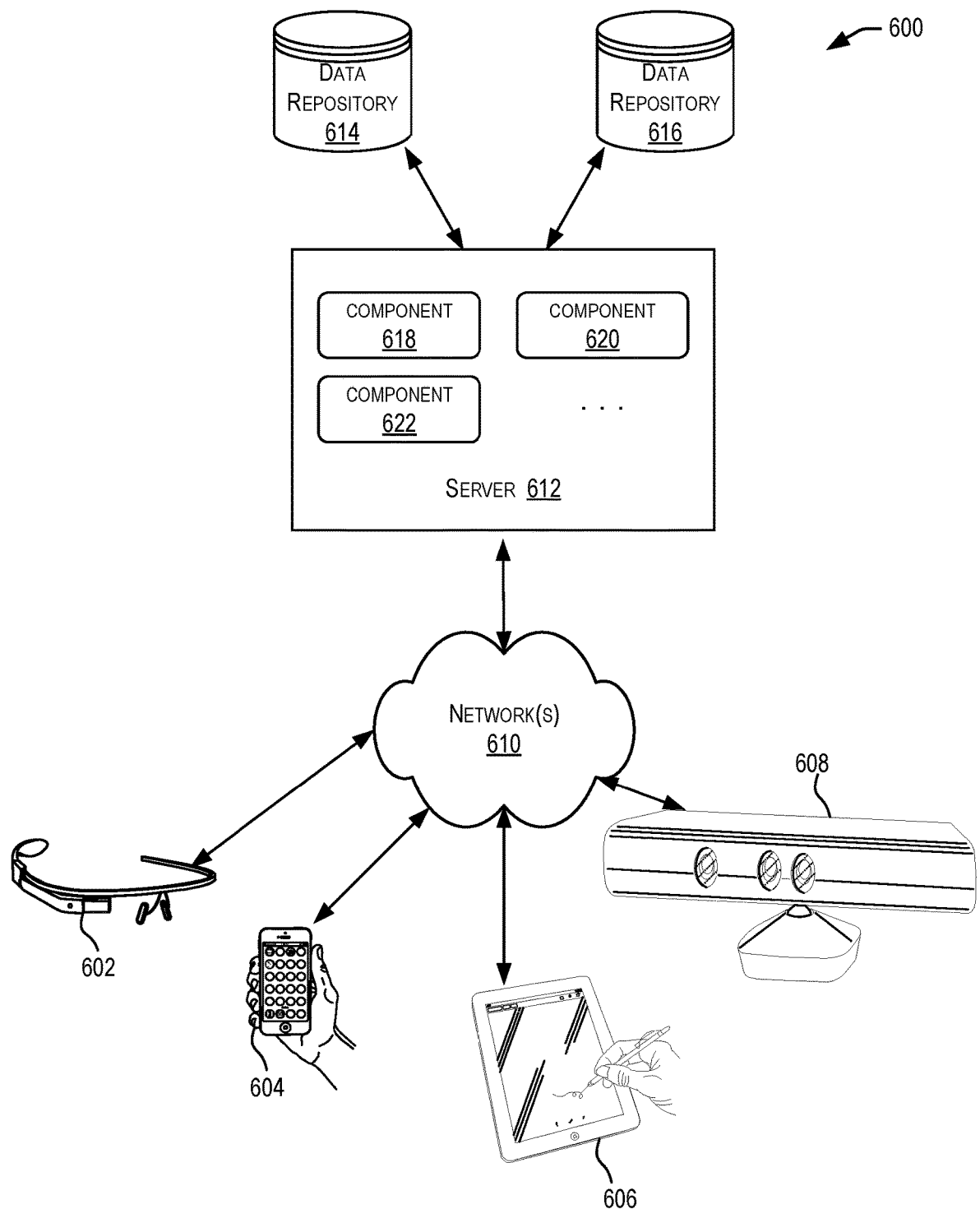
FIG. 6 is a simplified diagram of a distributed system for implementing one or more embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable an application-initiated conversation (AIC) between a user and a chatbot to be created. For example, the server 612 may be a server that executes the application that initiates the conversation or a server that executes the chatbot.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to configure a chatbot and/or a software application, to add or remove a chatbot from a chatbot system, and to engage in conversation with a chatbot (e.g., directly or through a digital assistant), in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store AIC-related configuration information such as rules and their associated conditions, and mappings between event identifiers and dialog flow states. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
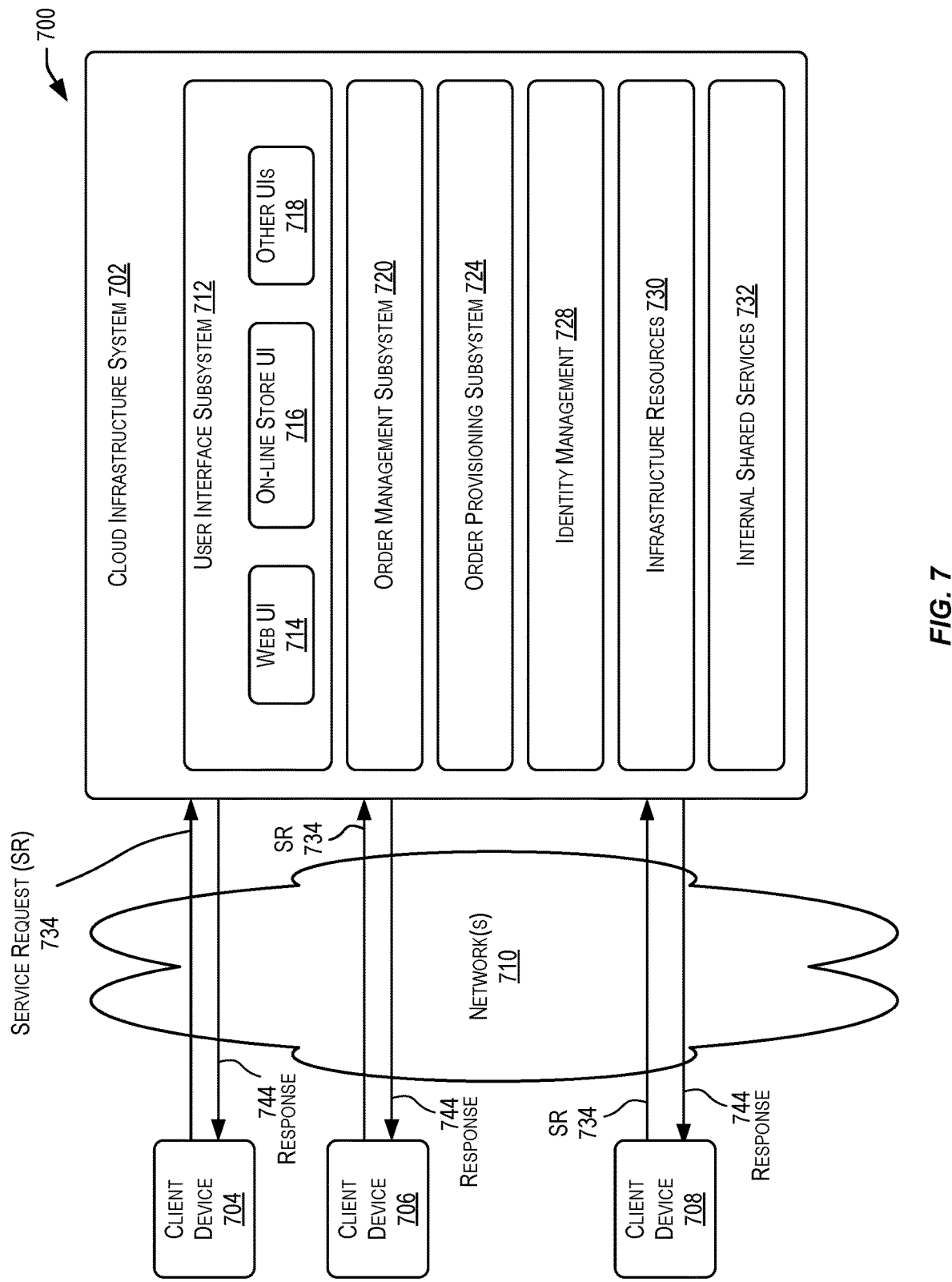
FIG. 7 is a simplified block diagram of a cloud-based system environment in which various application-initiated-conversation-related services may be offered as cloud services, in accordance with certain embodiments.

In certain embodiments, the AIC-related functionalities described in this disclosure may be offered as services via a cloud environment. FIG. 7 is a simplified block diagram of a cloud-based system environment in which various AIC-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 702. Cloud infrastructure system 702 then performs processing to provide the services requested in the customer's subscription order. For example, a customer may submit a subscription order for registering a skill bot with a master bot or otherwise adding/configuring a skill bot within a chatbot system. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request an AIC-related service described in this disclosure.

In some embodiments, the processing performed by cloud infrastructure system 702 for providing AIC-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for automatically determining, based on usage trends for a group of users, which conditions to apply for triggering an AIC. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for an AIC-related service offered by cloud infrastructure system 702. As part of the order, the customer may provide information identifying a set of users who are authorized to access a particular skill or bot.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the AIC-related service, the response may include a confirmation that a bot has been successfully configured for handling AICs triggered by a particular software application.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
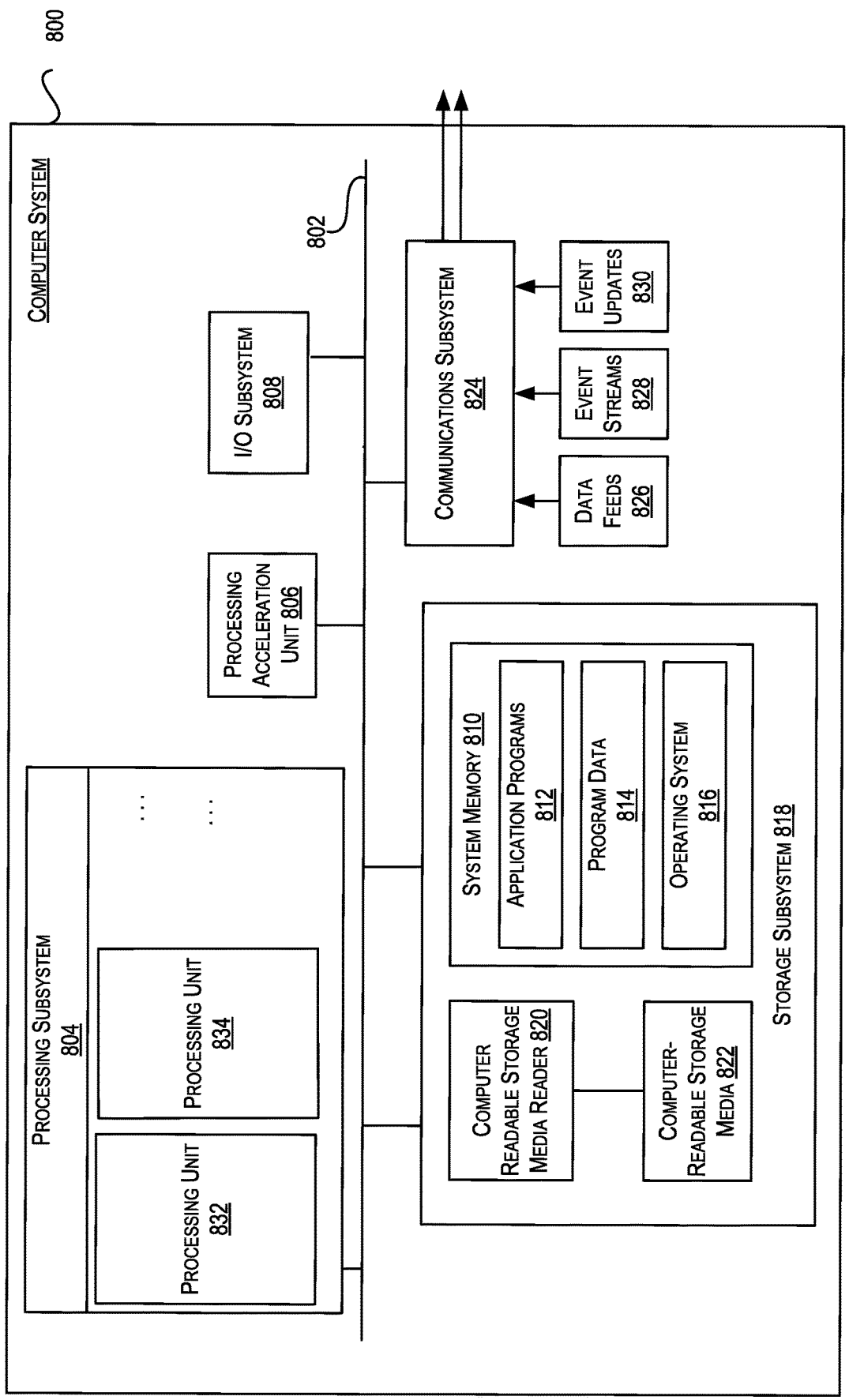
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM may contain data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used for communications between a master bot and an individual bot in connection with a routing decision, or for communications between an individual bot and a user after the user has been routed to the individual bot.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method of operating a computer-implemented chatbot system, the method comprising:
   receiving, by the computer-implemented chatbot system, an event notification from a software application;
   based on information in the event notification, outputting, in an ongoing conversation between a first chatbot of the computer-implemented chatbot system and a user, a prompt requesting the user to confirm a start of a new conversation;
   receiving user input comprising an indication to start the new conversation; and
   starting, in the ongoing conversation, the new conversation between the user and a second chatbot of the computer-implemented chatbot system.

2. The method of claim 1, further comprising:
   identifying, by the computer-implemented chatbot system, the second chatbot based on an event identifier included in the event notification.

3. The method of claim 1, wherein the software application is executed on a computer system remote from the computer-implemented chatbot system.

4. The method of claim 1, further comprising:
   identifying, by the computer-implemented chatbot system, the second chatbot based on a communication channel through which the event notification was received by the computer-implemented chatbot system, the communication channel being a channel created for sending communications between the second chatbot and the software application.

5. The method of claim 1, further comprising:
   identifying, by the computer-implemented chatbot system, the second chatbot based on a chatbot identifier included in the event notification.

6. The method of claim 1, further comprising:
   storing a dialog flow state of the ongoing conversation to a context stack for dialog flows that are not yet terminated.

7. The method of claim 1, further comprising:
   based on the received user input, suspending the ongoing conversation and starting the new conversation; and
   outputting a second prompt to the user at an end of the new conversation, the second prompt requesting the user to confirm whether to resume the suspended conversation.

8. The method of claim 1, further comprising:
   identifying, by the computer-implemented chatbot system, the user based on a user identifier included in the event notification.

9. The method of claim 1, further comprising:
   determining an initial dialog flow state for the new conversation based on a stored association between the initial dialog flow state and an event identifier included in the event notification.

10. The method of claim 1, further comprising:
    determining, by the computer-implemented chatbot system, a value of a variable from the event notification; and
    providing, by the computer-implemented chatbot system, the value of the variable as an input to the second chatbot, wherein a dialog flow state of the new conversation includes an action to be performed by the second chatbot or a message from the second chatbot to the user, and wherein the action to be performed or the message to the user depends on the value of the variable.

11. A computer system comprising:
    two or more chatbots, the two or more chatbots including a first chatbot and a second chatbot;
    one or more processors; and
    a memory coupled to the one or more processors, the memory storing a plurality of instructions that, when executed by the one or more processors, cause the one or more processors to perform processing comprising:
      receiving an event notification from a software application;
      based on information in the event notification, outputting, in an ongoing conversation between the first chatbot and a user, a prompt requesting the user to confirm a start of a new conversation;
      receiving user input comprising an indication to start the new conversation; and
      starting, in the ongoing conversation, the new conversation between the user and the second chatbot.

12. The computer system of claim 11, wherein the instructions further cause the one or more processors to perform processing comprising:
    identifying the second chatbot based on an event identifier included in the event notification.

13. The computer system of claim 11, wherein the instructions further cause the one or more processors to perform processing comprising:
    identifying the second chatbot based on a communication channel through which the event notification was received by the computer system, the communication channel being a channel created for sending communications between the second chatbot and the software application.

14. The computer system of claim 11, wherein the instructions further cause the one or more processors to perform processing comprising:
    identifying the second chatbot based on a chatbot identifier included in the event notification.

15. The computer system of claim 11, wherein the instructions further cause the one or more processors to perform processing comprising:
    storing a dialog flow state of the ongoing conversation to a context stack for dialog flows that are not yet terminated.

16. The computer system of claim 11, wherein the instructions further cause the one or more processors to perform processing comprising:
    based on the received user input, suspending the ongoing conversation and starting the new conversation; and outputting a second prompt to the user at an end of the new conversation, the second prompt requesting the user to confirm whether to resume the suspended conversation.

17. The computer system of claim 11, wherein the instructions further cause the one or more processors to perform processing comprising:

identifying the user based on a user identifier included in the event notification.

18. The computer system of claim 11, wherein the instructions further cause the one or more processors to perform processing comprising:

determining an initial dialog flow state for the new conversation based on a stored association between the initial dialog flow state and an event identifier included in the event notification.

19. The computer system of claim 11, wherein the instructions further cause the one or more processors to perform processing comprising:

determining a value of a variable from the event notification; and providing the value of the variable as an input to the second chatbot, wherein a dialog flow state of the new conversation includes an action to be performed by the second chatbot or a message from the second chatbot to the user, and wherein the action to be performed or the message to the user depends on the value of the variable.

20. A non-transitory computer-readable memory storing instructions that, when executed by one or more processors of a computer-implemented chatbot system, cause the one or more processors to perform processing comprising:

receiving an event notification from a software application;

based on information in the event notification, outputting, in an ongoing conversation between a first chatbot of the computer-implemented chatbot system and a user, a prompt requesting the user to confirm a start of a new conversation;

receiving user input comprising an indication to start the new conversation; and starting, in the ongoing conversation, the new conversation between the user and a second chatbot of the computer-implemented chatbot system.

* * * * *

UNITED STATES PATENT AND TRADEMARK OFFICE
CERTIFICATE OF CORRECTION

PATENT NO. : 11,283,737 B2
APPLICATION NO. : 17/234620
DATED : March 22, 2022
INVENTOR(S) : Parekh et al.

It is certified that error appears in the above-identified patent and that said Letters Patent is hereby corrected as shown below:

On the Title Page

Column 2, Item (57) under Abstract, Line 1, delete "for described".

In the Specification

In Column 22, Line 55, delete "infra-red" and insert -- infrared --, therefor.

Signed and Sealed this
Sixteenth Day of August, 2022

Katherine Kelly Vidal
*Director of the United States Patent and Trademark Office*